United States Patent [19]

Atkins et al.

[11] Patent Number: 5,762,698
[45] Date of Patent: Jun. 9, 1998

[54] METHOD FOR DISPERSING OPTICAL BRIGHTENERS IN WATERBORNE COATING COMPOSITIONS

[76] Inventors: Douglas G. Atkins, 201 Tanner Ct.; Theron E. Parsons, III, 1245 Watauga St., both of Kingsport, Tenn. 37660; William C. Gose, 213 Royal Dr., Kingsport, Tenn. 37663

[21] Appl. No.: 805,256

[22] Filed: Feb. 24, 1997

Related U.S. Application Data

[62] Division of Ser. No. 544,331, Oct. 17, 1995, Pat. No. 5,650,455.
[51] Int. Cl.$^6$ .................................................. C08J 3/02
[52] U.S. Cl. ........................................ 106/271; 427/385.5
[58] Field of Search .......................... 524/94, 558, 567; 252/301.21, 301.22, 301.23, 301.24, 301.27; 106/271; 427/385.5

[56] References Cited

U.S. PATENT DOCUMENTS 4,741,860  5/1988  Hartman ........................ 252/301.21

FOREIGN PATENT DOCUMENTS 0 336 029  4/1988  European Pat. Off. .
0 303 803  6/1988  European Pat. Off. .

*Primary Examiner*—Peter D. Mulcahy
*Attorney, Agent, or Firm*—Rose M. Allen; Harry J. Gwinnell

[57] ABSTRACT

This invention provides a method for rendering a water-based coating (i.e., one which contains essentially no organic solvent) fluorescent. Also provided is a method for measuring the extent of coverage and thickness of a water-based coating by incorporating therein a minor amount of an emulsion of an insoluble compound which absorbs ultraviolet light and fluoresces strongly in the visible region of the spectrum, so that the intensity of the fluorescence serves as an indication of the degree of coverage and thickness of the film. Also provided is a method for enhancing the apparent brightness of a film pigmented with light colored pigments. In the case where white pigments such as titanium dioxide are used, the effect is to increase the apparent whiteness of the film.

14 Claims, No Drawings

METHOD FOR DISPERSING OPTICAL BRIGHTENERS IN WATERBORNE COATING COMPOSITIONS

This is a divisional application of application Ser. No. 08/544,331, filed Oct. 17, 1995, U.S. Pat. No. 5,650,455.

FIELD OF THE INVENTION

This invention relates to the field of coating compositions. In particular, it relates to a method for dispersing otherwise insoluble optical brightener compounds in aqueous coating compositions.

BACKGROUND OF THE INVENTION

There are many occasions in which it is necessary to apply a coating to a substrate in a thin, very uniform film, and in which it is desired to have a simple method for measuring the film thickness or, in the case of transparent films, to render the film visible so that a concise coating may be assured. This is particularly important when, for example, a film of an adhesion promoter is applied to a substrate to which a final finish coat is to be applied. In such a case, it is necessary to ensure that the substrate is coated completely and at the same time, that the adhesion promoting film is neither too thin nor too thick to give satisfactory appearance and adhesion of the finish coat.

The use of fluorescent compounds, including several of the so-called "optical brighteners" as indicators of the presence of a film, and of its thickness, is well known to the art. However, none of the prior art methods are applicable to coatings which are essentially free of organic solvents, since the coating compositions generally require that the fluorescent compound be soluble in an organic solvent. Unfortunately, some of the most efficient fluorescers such as the bis(benzoxazolyl)stilbenes and their homologs are, for all practical purposes, insoluble in water.

U.S. Pat. No. 4,741,860 describes a solvent-borne coating composition which contains a chlorinated poly-olefin, at least 0.1% by weight, based on the total weight of the composition, of an optical brightener. This reference teaches that the use of non-polar solvents is preferred.

EP 303803 describes a method for mixing colorants into a stable aqueous suspension of crosslinked polymer.

EP 336029 teaches polycyclic fluorescent compounds which absorb ultraviolet light in the range of 240 to 400 nanometers, and whose fluorescence is preferably below 400 nm. This reference teaches that less than 30% of the fluorescence energy should be above 400 nm. The compounds described are either relatively low molecular weight monomeric hydrocarbons or, preferably, functionalized fluorescent compounds which are reacted to form a part of the substrate backbone. Fluorescence in the visible region of the spectrum (i.e. 400 nm and above) is considered undesirable in the application of this reference. It is further stated that the fluorescent compounds should be soluble in the coating.

Water-soluble fluorescent compounds are known; e.g., optical brighteners used in detergents for increasing apparatus whiteness. However, the common water-soluble optical brighteners have insufficient thermal stability to be useful in coating compositions. Further, such water-soluble fluorescent compounds generally contain sodium sulfonate or amino functional groups which may be reactable with other typical components in coating compositions.

SUMMARY OF THE INVENTION

One object of this invention is to provide a method for rendering a water based coating (i.e., one which contains essentially no organic solvent) fluorescent. Another object of the invention is to provide a method for measuring the extent of coverage and thickness of a water-based coating by incorporating therein a minor amount of an emulsion of an insoluble compound which absorbs ultraviolet light and fluoresces strongly in the visible region of the spectrum, so that the intensity of the fluorescence serves as an indication of the degree of coverage and thickness of the film. Still another object of the invention is to provide a method for enhancing the apparent brightness of a film pigmented with light colored pigments. In the case where white pigments such as titanium dioxide are used, the effect is to increase the apparent whiteness of the film. One further object of the invention is to provide an adhesion promoting coating comprising a chlorinated polyolefin or maleated polyolefin, emulsifying agents, and an insoluble optical brightener, such as Eastman Chemical Company's EASTOBRITE® OB-1, which has been rendered water-dispersible by incorporation into an emulsifiable polyolefin wax.

DETAILED DESCRIPTION OF THE INVENTION

The present invention provides an aqueous emulsion comprising (a) a low molecular weight emulsifiable polyolefin wax;

(b) a non-ionic surfactant;

(c) water; and (d) an essentially water-insoluble optical brightener compound.

In the above emulsion, the low molecular weight emulsifiable polyolefin wax is any wax which is capable of ready emulsion, for example, the oxidized polyolefins and modified polyolefins such as chlorinated polyolefins and maleated polyolefins. Such a wax preferably has a density in the range of about 0.92–0.96, melt viscosities in the range of about 50–4000 cp at 125° C., and an acid number in the range of about 12–55. Exemplary waxes include an oxidized polyethylene wax having a density of 0.939, a melt viscosity of 900 cp at 125° C., and an acid number of about 15; an oxidized poly-ethylene wax having a density of 0.955, a melt viscosity of 250 cp at 125° C., and an acid number of about 16; and a maleated polypropylene wax having a density of 0.934, a melt viscosity of 400 cp at 190° C., and an acid number of about 47.

Preferred examples of non-ionic surfactants include non-ionic surfactants such as alkyl polyglycol ethers such as ethoxylation products of lauryl, oleyl, and stearyl alcohols; and alkyl phenol polyglycol ethers such as ethoxylation products of octyl- or nonylphenol, diisopropyl phenol, tri-isopropyl phenol. A preferred nonionic surfactant is TERGITOL 15-S-15, which is an ethoxylated linear alcohol having a hydrophilic-lipophilic balance of 15.4 as determined according to Griffin, W. C. , Office. Dig. Federation Paint Varnish Prod. Blubs, 28, 446 (1956).

The fluorescent or optical brightener compounds of this invention are water-insoluble compounds which absorb ultraviolet light of wavelengths in the range from about 450 to about 480 nm and fluoresce in the range of about 420 to 450 nm. Preferred compounds are bis(benzoxazolyl) stilbenes of the general formula in which $R^1$ and $R^2$ are

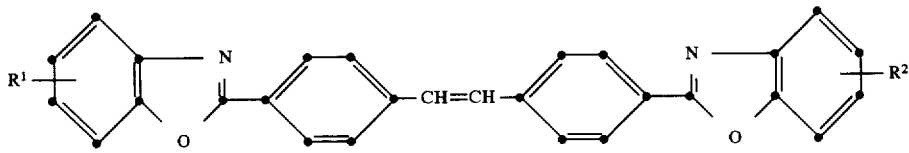

independently hydrogen; halogen; $C_1$–$C_4$ alkyl; and $C_1$–$C_6$ alkoxycarbonyl. Especially preferred compounds include compounds of this formula wherein $R^1$ and $R^2$ are independently hydrogen or methyl. Preferred optical brighteners include Eastman's EASTOBRITE® OB-1, Ciba Geigy's UVITEX® MES and UVITEX® OB, Hoechst KS, Hoechst KSN, and Leucopure® EGM from Sandoz.

Although this invention is directed primarily to the use of optical brighteners of the bis(benzoxazolyl)-stilbene class, it should be understood that in general any optical brightener, defined as a compound which absorbs ultraviolet light and fluoresces in the visible region of the spectrum, which is essentially insoluble in water and which can be incorporated into an emulsion with an oxidized polyolefin wax may be used. As used herein, the phrase "essentially insoluble" means a compound which has a solubility in water of less than about 0.3 g/L at 24° C. Preferably, the fluorescent compound absorbs ultraviolet light of wavelength shorter than 400 nm, and emits light at a wavelength above about 420 nm. Compounds which absorb light of wavelength above about 400 nm are colored and would affect the color of the applied coating. Since both absorption and emission cover a range of wavelengths, the ranges above refer to the region over which about 80% of the absorption and emission occur.

The concentration of the fluorescent compound in the final coating formulation may be varied widely, preferably from about 5 ppm or less to as much as 500 ppm. In general, the lowest concentration which will give the desired degree of fluorescence should be used, since the inherent color of the brightener will become more apparent as the concentration increases. For most purposes, the preferred concentration of fluorescent compound in the coating is between 100 and 450 ppm.

The objects of the invention can be accomplished by incorporating into a water-based coating composition an aqueous emulsion of a low molecular weight oxidized polyolefin wax which contains a water-insoluble optical brightener.

An example of a preferred aqueous emulsion containing the optical brightener has the following composition:

| Material | Wt. %, Range |
| --- | --- |
| Low. mol. wt. oxidized polyolefin wax | 3.0–8.0 |
| Nonionic Surfactants | 2.0–4.0 |
| Potassium hydroxide | 0.1–0.2 |
| Silicone antifoam | 0.2–0.4 |
| Antimicrobials | 0.0–0.2 |
| Deionized water | 37.0–69.6 |
| EASTOBRITE ® OB-1 | 25.0–50.0 |

The maximum concentration of the optical brightener is limited by the viscosity of the emulsion, which must be low enough to permit the emulsion to be stirred into the coating system.

The coatings of this invention are useful primarily as undercoatings, especially for coatings which serve as adhesion promoters between two different substrates such as polyolefin moldings used in automobile bodies, and the finish paint. However, that the principle of rendering a water-based coating fluorescent is generally applicable. Such coatings might be used for aesthetic reasons to enhance the apparent whiteness of white coatings, or the brightness of pastel paints. The principle of using an aqueous dispersion of an optical brightener, as provided by this invention is not restricted to undercoatings.

Thus, as a further aspect of the present invention, there is provided an adhesion promoting composition comprising
(I) a chlorinated or maleated polyolefin;
(II) an aqueous emulsion comprising
   (a) a low molecular weight emulsifiable polyolefin wax;
   (b) a non-ionic surfactant;
   (c) water; and
   (d) an essentially water-insoluble optical brightener compound.

If fluorescence is to be used as an indication of film uniformity and thickness, it is essential that the fluorescent material, if not actually dissolved in the coating, be present in uniform, exceedingly finely dispersed particles, and that it not settle or segregate on storage, or be readily stirred into a dispersion state.

As used herein, the term "chlorinated polyolefin" refers to a chlorinated polyolefin having a number average molecular weight in the range of 9,000 to 45,000, a softening point in the range of 75° C. to 105° C., and an amount of chlorine in the range of 15 to 35 weight percent based on the weight of the polyolefin. One embodiment of the chlorinated polyolefin useful in this invention is disclosed in U.S. Pat. No. 3,579,485. Another useful chlorinated polyolefin is this chlorinated polyolefin reacted with a hydroxyl group containing primary amine to form a chlorinated, imidized polyolefin. These polyolefins are known and described in U.S. Pat. No. 4,954,573. In a preferred embodiment, the chlorinated polyolefin has a number average molecular weight in the range of 9,000 to 16,000, a softening point in the range of 80° C. to 95° C., and an amount of chlorine in the range of 18 to 22 percent, based on the weight of the polyolefin. Further examples of chlorinated polyolefins can be found in U.S. Pat. Nos. 3,579,485; 4,070,421; 4,966,947; 4,962,149; 5,198,485; and 4,954,573, incorporated herein by reference.

As used herein, the term "maleated polyolefin" refers to a polyolefin which has been functionalized by reaction with compounds such as maleic anhydride. Examples include maleated polybutylene, maleated polypropylene, and maleated polyethylene. Examples of commercially-available maleated polyolefins includes POLYBOND®, available from BP Performance Polymers, Inc., MAPO maleated polyolefin dispersion, available from Eastman Chemical Company, and from Allied Chemicals, Polyace® 573. Further examples of maleated polyolefins can be found in U.S. Pat. Nos. 4,874,818; 4,338,230; 3,919,176; and 5,281,670, incorporated herein by reference.

The adhesion promoting compositions optionally contain other typical additives such as antioxidants, including, for example, hindered phenols, thioesters, organophosphites, and hindered amines, which may readily be dispersed or emulsified in the aqueous emulsion system. Additional additives include coupling agents, antistatic agents, nucleating agents, metal deactivators, lubricants, slip agents, antiblocking agents, uv inhibitors, flame retardants, and the like.

The problem with obtaining stable dispersions is reflected in the prior art, in which only organic solvent-based systems or water-soluble fluorescers are used. We have found no reference which suggests the possibility that such an insoluble, extremely fluorescent compound as 4,4' (bisbenzoxazolyl)stilbene (e.g., EASTOBRITE® OB-1) could be dispersed evenly enough in a water-based system to be used as a fluorescent indicator of film thickness. Indeed, many attempts to prepare stable dispersions of this brightener by conventional means have been unsuccessful. Optical brighteners of this class are normally used in synthetic fibers or plastics, into which they are incorporated at high temperature. Their use in coatings at low temperatures has hitherto been considered impossible.

Thus, as a further aspect of the present invention, there is provided a method for determining the thickness and coverage of a water-borne coating composition, which comprises applying a water-borne coating composition having therein, at least about 0.01 weight percent of an aqueous emulsion comprising (a) a low molecular weight emulsifiable polyolefin wax;
(b) a non-ionic surfactant;
(c) water; and
(d) an essentially water-insoluble optical brightener compound; to a substrate and measuring the fluorescence of said coating upon exposure to ultraviolet light.

The invention is not limited to waterborne adhesion promoters, but is also generally applicable to any lightly-pigmented water-borne finish, whether used as an undercoat or as a finish coat, as illustrated in Example 3 below.

Thus, as a further aspect of the present invention, there is provided a method for improving the apparent brightness of a lightly-pigmented waterborne coating composition, which comprises incorporating in said composition, an aqueous emulsion comprising (a) a low molecular weight emulsifiable polyolefin wax;
(b) a non-ionic surfactant;
(c) water; and
(d) an essentially water-insoluble optical brightener compound.

EXPERIMENTAL SECTION

Example 1

This examples illustrates the application of the process of this invention in a film prepared from a chlorinated polyolefin adhesion promoter.

A coating was prepared from an oil in water emulsion of a chlorinated polyolefin (Eastman's CPO) which contained 24% of chlorinated polyolefin, water, no organic solvent, and less than 3% of ammonia as a neutralizing amine. To each of three 25 g samples of this emulsion was added 10 g of water and then none, 2 drops, and 5 drops of a 50% dispersion of Eastman's EASTOBRITE® OB-1 dispersed in water and oxidized polyolefin wax as described above.

Each sample was shaken to mix the contents, then drawn down onto "Form 70" Laneta paper to give a 1.5 mil wet film. The films were dried at 50° C., then viewed under an ultraviolet lamp. There was no fluorescence in the control sample; the sample which contained 2 and 5 drops of the fluorescent brightener dispersion showed strong fluorescence; the degree of fluorescence increased with the amount of brightener dispersion present.

It was noted particularly in these experiments that the fluorescence was completely uniform; there was no indication of "clumping" of the fluorescent compound in the film which would have indicated an uneven distribution of the fluorescent compound.

Example 2

This example illustrates the visual effect of increased coating thickness on film appearance of a chlorinated polyolefin film when viewed under ultraviolet light.

A coating was prepared from the chlorinated polyolefin dispersion described in Example 1, (20 g) and 0.02 g of the EASTOBRITE® OB-1 dispersion. The components were agitated sufficiently to mix them thoroughly, then drawn down onto cold rolled steel and dried. Dry film thicknesses of 0.194, 0.419, 0.653, 0.781, 0.847, and 1.111 mils were obtained. When these films were viewed under ultraviolet light, a smooth, definite increase in fluorescence was obtained with each increase in thickness of the film.

Example 3

This example illustrates the effectiveness of the process of this invention in imparting fluorescence to a pigmented and unpigmented melamine baking enamel, coatings were prepared from pigmented and unpigmented melamine baking enamels. In each case, 20 g of enamel (7.6 g of solids) and 0.02 g of the EASTOBRITE® OB-1 dispersion were combined, mixed thoroughly, and drawn down onto cold rolled steel. The films were cured by baking and observed under ultraviolet light. Film thicknesses of 0.223, 0.393, 0.550, 0.724, 0.831, and 1.206 mils were obtained. In both the pigmented and unpigmented enamels, a smooth increase in fluorescence with film thickness was observed.

Example 4

This example shows that uniform and usefully fluorescent coatings are easily prepared which contain between 25 ppm and 500 ppm of EASTOBRITE® OB-1.

Films were prepared as described previously from the chlorinated polyolefin dispersion described in Example 1 which contained, respectively, 500, 250, 100, and 25 ppm of EASTOBRITE® OB-1. The ingredients were mixed, then allowed to roll on rollers for 4 hours, then drawn down onto cold rolled B1000 steel panels, using a No. 7 wire rod. The coatings were observed under an ultraviolet light after they had air-dried for 72 hours. All of the coatings were fluorescent. It was judged that a concentration of 100 ppm of brightener would be adequate for practical purposes.

Example 5

Dispersions were prepared as described in the table above which contained, instead of EASTOBRITE® OB-1, the same amounts of Uvitex® MES and of Leucopure® EGM, respectively. When these were mixed into the chlorinated polyolefin dispersion at concentrations of 500 and 1500 ppm, respectively, both gave smooth, uniformly fluorescent coatings when coated onto steel plates as described in Example 4.

Example 6

Attempts were made to dispense without the oxidized polyolefin wax dispersing agent used in the previous examples by simply mixing EASTOBRITE® OB-1 or Uvitex® MES into the chlorinated polyolefin coating formulation. At brightener concentrations of 250 ppm, the brighteners did not disperse well into the coating formulation, and the resulting coatings exhibited nonuniform fluorescence.

Example 7

This example illustrates the effectiveness of the EASTOBRITE® OB-1 dispersion in a coating formulation prepared from an aqueous dispersion of a maleated polyolefin, rather than the chlorinated polyolefin dispersion used in Examples 1–6. The dispersion was prepared as before, using 20 g of Eastman MAPO maleated polyolefin dispersion and 0.002 g. of the 50% dispersion of EASTOBRITE® OB-1 in oxidized polyolefin wax. A uniform dispersion was obtained, which, drawn down onto cold rolled steel as usual, gave a uniformly fluorescent coating.

We claim:

1. An aqueous emulsion comprising
   (a) a low molecular weight emulsifiable polyolefin wax in the amount of 3.0 to 8.0 weight percent based on the weight of the aqueous emulsion;
   (b) a non-ionic surfactant in the amount of 2.0 to 4.0 weight percent based on the weight of the aqueous emulsion;
   (c) water in the amount of 37.0 to 69.6 weight percent based on the weight of the aqueous emulsion; and
   (d) an essentially water-insoluble optical brightener compound in the amount of 25.0 to 50.0 weight percent based on the weight of the aqueous emulsion.

2. The emulsion of claim 1, wherein the low molecular weight emulsifiable polyolefin wax is a wax having a density in the range of about 0.92–0.96, melt viscosities in the range of about 50–4000 cp at 125° C., and an acid number in the range of about 12–55.

3. The emulsion of claim 1, wherein the optical brightener compound is a compound having the formula

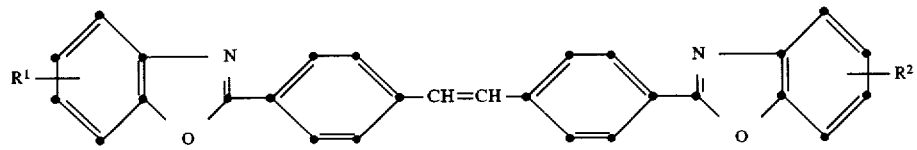

wherein $R^1$ and $R^2$ are independently hydrogen; halogen; $C_1$–$C_4$ alkyl; or $C_1$–$C_6$ alkoxycarbonyl.

4. The emulsion of claim 3, wherein $R^1$ and $R^2$ are hydrogen.

5. The emulsion of claim 3, wherein $R^1$ and $R^2$ are methyl.

6. A method for determining the thickness and coverage of a waterborne coating composition, which comprises applying a waterborne coating composition having therein, at least about 0.01 weight percent of an aqueous emulsion comprising
   (a) a low molecular weight emulsifiable polyolefin wax in the amount of 3.0 to 8.0 weight percent based on the weight of the aqueous emulsion;
   (b) a non-ionic surfactant in the amount of 2.0 to 4.0 weight percent based on the weight of the aqueous emulsion;
   (c) water in the amount of 37.0 to 69.6 weight percent based on the weight of the aqueous emulsion; and
   (d) an essentially water-insoluble optical brightener compound in the amount of 25.0 to 50.0 weight percent based on the weight of the aqueous emulsion.

7. The method of claim 6, wherein the low molecular weight emulsifiable polyolefin wax is a wax having a density in the range of about 0.92–0.96, melt viscosities in the range of about 50–4000 cp at 125° C., and an acid number in the range of about 12–55.

8. The method of claim 6, wherein the optical brightener compound is a compound having the formula

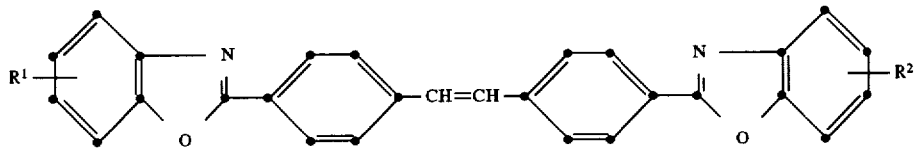

wherein $R^1$ and $R^2$ are independently hydrogen; halogen; $C_1$–$C_4$ alkyl; or $C_1$–$C_6$ alkoxycarbonyl.

9. The method of claim 6, wherein $R^1$ and $R^2$ are hydrogen.

10. A method for improving the apparent brightness of a lightly-pigmented waterborne coating composition, which comprises incorporating in said composition, an aqueous emulsion comprising
    (a) a low molecular weight emulsifiable polyolefin wax in the amount of 3.0 to 8.0 weight percent based on the weight of the aqueous emulsion;
    (b) a non-ionic surfactant in the amount of 2.0 to 4.0 weight percent based on the weight of the aqueous emulsion;
    (c) water in the amount of 37.0 to 69.6 weight percent based on the weight of the aqueous emulsion; and
    (d) an essentially water-insoluble optical brightener compound in the amount of 25.0 to 50.0 weight percent based on the weight of the aqueous emulsion.

11. The method of claim 10, wherein the low molecular weight emulsifiable polyolefin wax is a wax having a density in the range of about 0.92–0.96, melt viscosities in the range of about 50–4000 cp at 125° C., and an acid number in the range of about 12–55.

12. The method of claim 10, wherein the optical brightener compound is a compound having the formula

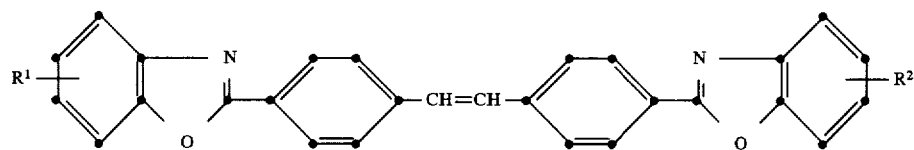
wherein $R^1$ and $R^2$ are independently hydrogen; halogen; $C_1-C_4$ alkyl; or $C_1-C_6$ alkoxycarbonyl.
13. The method of claim 12, wherein $R^1$ and $R^2$ are hydrogen.
14. The method of claim 12, wherein $R^1$ and $R^2$ are methyl.
* * * * *